(12) United States Patent
Iwano et al.

(10) Patent No.: US 12,553,749 B2
(45) Date of Patent: Feb. 17, 2026

(54) SPATIAL SENSING DEVICE, SPATIAL SENSING SYSTEM, AND SPATIAL SENSING METHOD

(71) Applicant: NEC Corporation, Tokyo (JP)

(72) Inventors: Tadayuki Iwano, Tokyo (JP); Yoshiaki Aono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/273,254

(22) PCT Filed: Mar. 29, 2021

(86) PCT No.: PCT/JP2021/013240
§ 371 (c)(1),
(2) Date: Jul. 19, 2023

(87) PCT Pub. No.: WO2022/208594
PCT Pub. Date: Oct. 6, 2022

(65) Prior Publication Data
US 2024/0118115 A1    Apr. 11, 2024

(51) Int. Cl.
*G01D 5/353* (2006.01)
*G01H 9/00* (2006.01)
*G01V 8/24* (2006.01)

(52) U.S. Cl.
CPC ......... *G01D 5/35338* (2013.01); *G01H 9/004* (2013.01); *G01V 8/24* (2013.01)

(58) Field of Classification Search
CPC ...... G01D 5/35338; G01H 9/004; G01V 8/24; G01S 5/18
See application file for complete search history.

(56) References Cited

U.S. PATENT DOCUMENTS 10,612,911 B1\* 4/2020 Pena, III ............... G01B 11/161
2022/0357421 A1\* 11/2022 Kojima .................... G01S 5/20

FOREIGN PATENT DOCUMENTS

| CN | 110220452 A | 9/2019 |
| JP | 2007-255966 A | 10/2007 |
| JP | 2012-198193 A | 10/2012 |
| JP | 2016-161512 A | 9/2016 |
| WO | 2020/095383 A1 | 5/2020 |
| WO | 2020/255358 A1 | 12/2020 |

OTHER PUBLICATIONS

International Search Report for PCT Application No. PCT/JP2021/013240, mailed on May 18, 2021.
English translation of Written opinion for PCT Application No. PCT/JP2021/013240, mailed on May 18, 2021.

\* cited by examiner

*Primary Examiner* — Tony Ko
(74) *Attorney, Agent, or Firm* — Sughrue Mion, PLLC

(57) ABSTRACT

Provided are a spatial sensing device, and the like, that are suitable for spatial sensing. This spatial sensing device (3) comprises a sensing data acquisition means (11) for acquiring sensing data through optical fiber sensing using a plurality of optical fiber cables (1) laid in different directions and an object detection means (12) for using the sensing data to detect the position of an object in a space of interest.

24 Claims, 13 Drawing Sheets

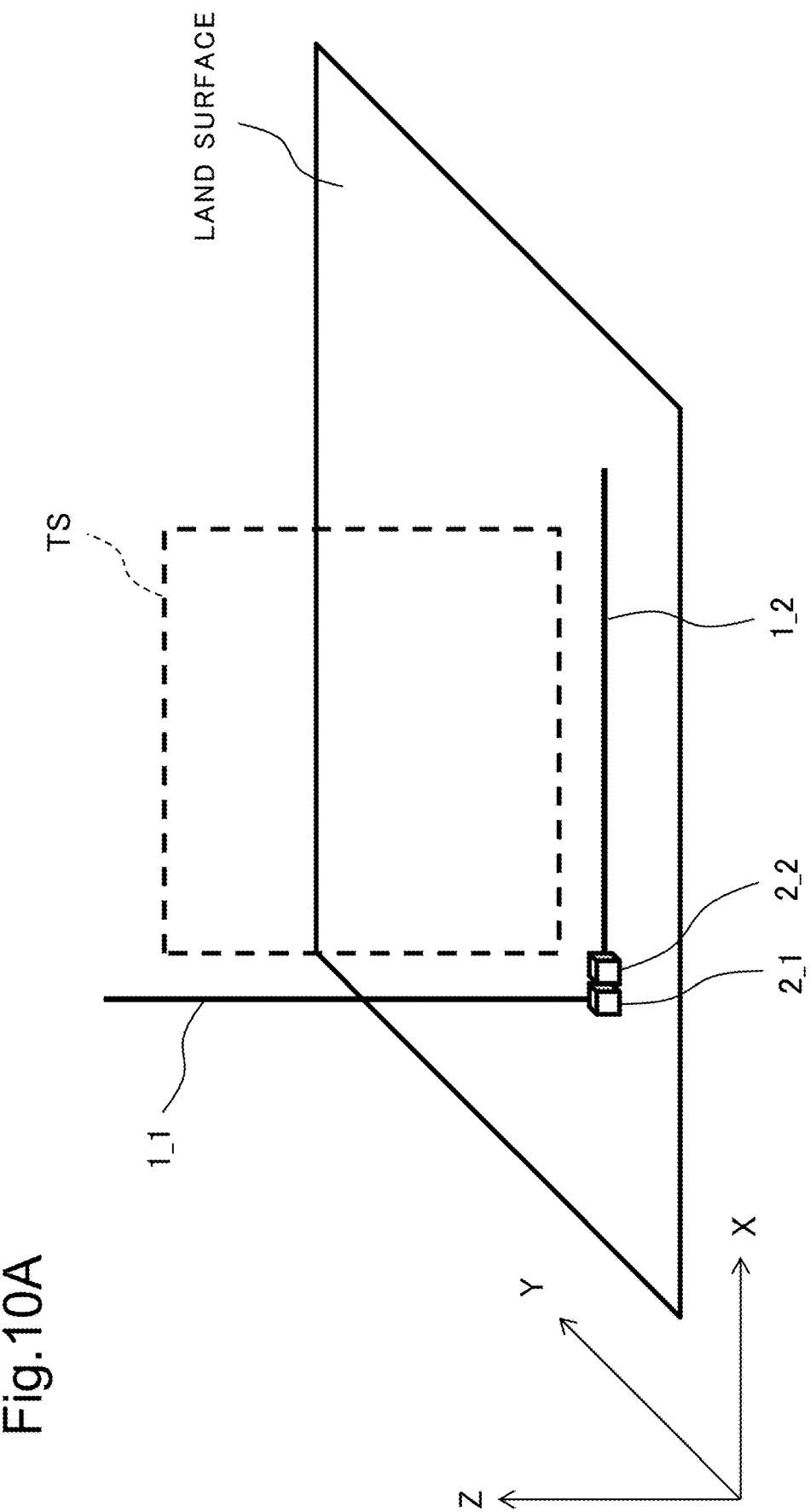

SPATIAL SENSING DEVICE, SPATIAL SENSING SYSTEM, AND SPATIAL SENSING METHOD

This application is a National Stage Entry of PCT/JP2021/013240 filed on Mar. 29, 2021, the contents of all of which are incorporated herein by reference, in their entirety.

TECHNICAL FIELD

The present invention relates to a spatial sensing device and the like.

BACKGROUND ART

A technique for detecting vibration, sound, temperature, or the like, based on optical fiber sensing is known. PTL 1, for example, discloses a technique of detecting vibration by using an optical fiber cable provided for a fence and thereby, detecting a predetermined event (a matter that a person grasps and swings a fence or the like).

CITATION LIST

Patent Literature

PTL 1: International Patent Publication No. WO2020/095383

SUMMARY OF INVENTION

Technical Problem

The technique described in PTL 1 uses one optical fiber cable (see FIG. 1 and the like in PTL 1). Commonly, when one optical fiber cable is used, linear sensing is performed. In other words, in the technique described in PTL 1, vibration in a linear area along one optical fiber cable is detected. Therefore, there is a problem that it is difficult to perform spatial sensing. Specifically, for example, there is a problem that it is difficult to detect a location of an object in a three-dimensional space.

The present disclosure has been made in order to solve the problem described above, and an object of the present disclosure is to provide a special sensing device and the like corresponding to spatial sensing.

Solution to Problem

One embodiment of a spatial sensing device according to the present disclosure includes: a sensing data acquisition means for acquiring sensing data based on optical fiber sensing using a plurality of optical fiber cables laid in directions different from one another; and an object detection means for detecting, by using the sensing data, a location of an object in a target space.

One embodiment of a spatial sensing system according to the present disclosure includes: a sensing data acquisition means for acquiring sensing data based on optical fiber sensing using a plurality of optical fiber cables laid in directions different from one another; and an object detection means for detecting, by using the sensing data, a location of an object in a target space.

One embodiment of a spatial sensing method according to the present disclosure includes: acquiring sensing data based on optical fiber sensing using a plurality of optical fiber cables laid in directions different from one another; and detecting, by using the sensing data, a location of an object in a target space.

Advantageous Effects of Invention

According to the present disclosure, a spatial sensing device and the like corresponding to spatial sensing can be provided.

BRIEF DESCRIPTION OF DRAWINGS

FIG. 7 is an illustrative diagram illustrating a specific example of an aspect of laying a first optical fiber cable, a specific example of an aspect of laying an individual second optical fiber cable, and the like.

FIG. 10A is an illustrative diagram illustrating a specific example of a laying direction of one first optical fiber cable, a specific example of a laying direction of one second optical fiber cable, and the like.

FIG. 10B is an illustrative diagram illustrating a specific example of a laying direction of one first optical fiber cable, a specific example of a laying direction of two second optical fiber cables, and the like.

EXAMPLE EMBODIMENT

Hereinafter, an example embodiment according to the present disclosure is described in detail with reference to the accompanying drawings.

First Example Embodiment

Figure 1:
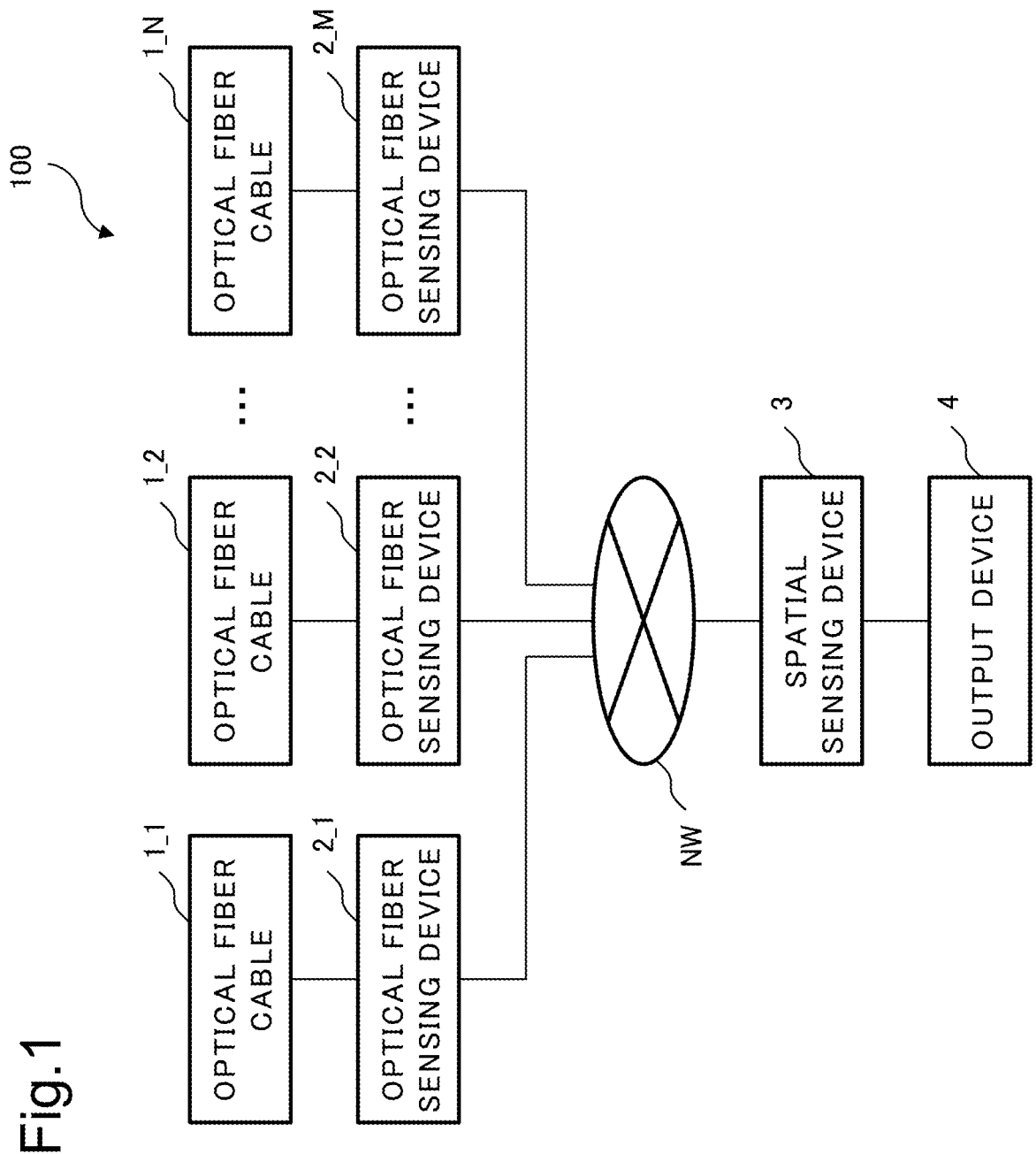
FIG. 1 is a block diagram illustrating main units of a spatial sensing system according to a first example embodiment.
Figure 2:
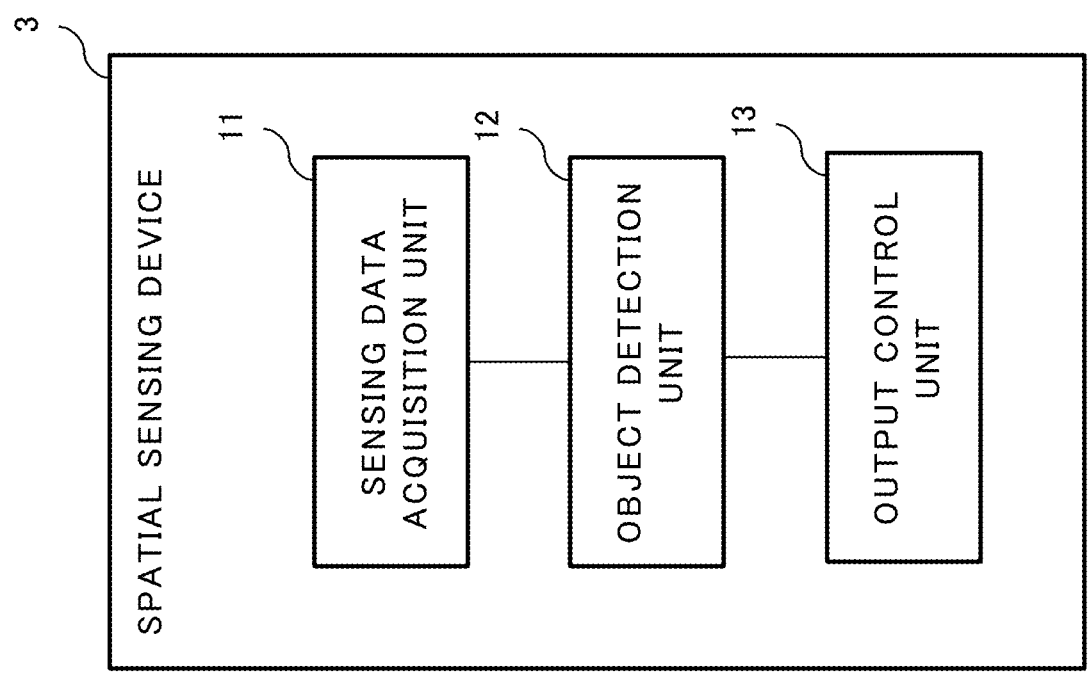
FIG. 2 is a block diagram illustrating main units of a spatial sensing device according to the first example embodiment.
Figure 10B:
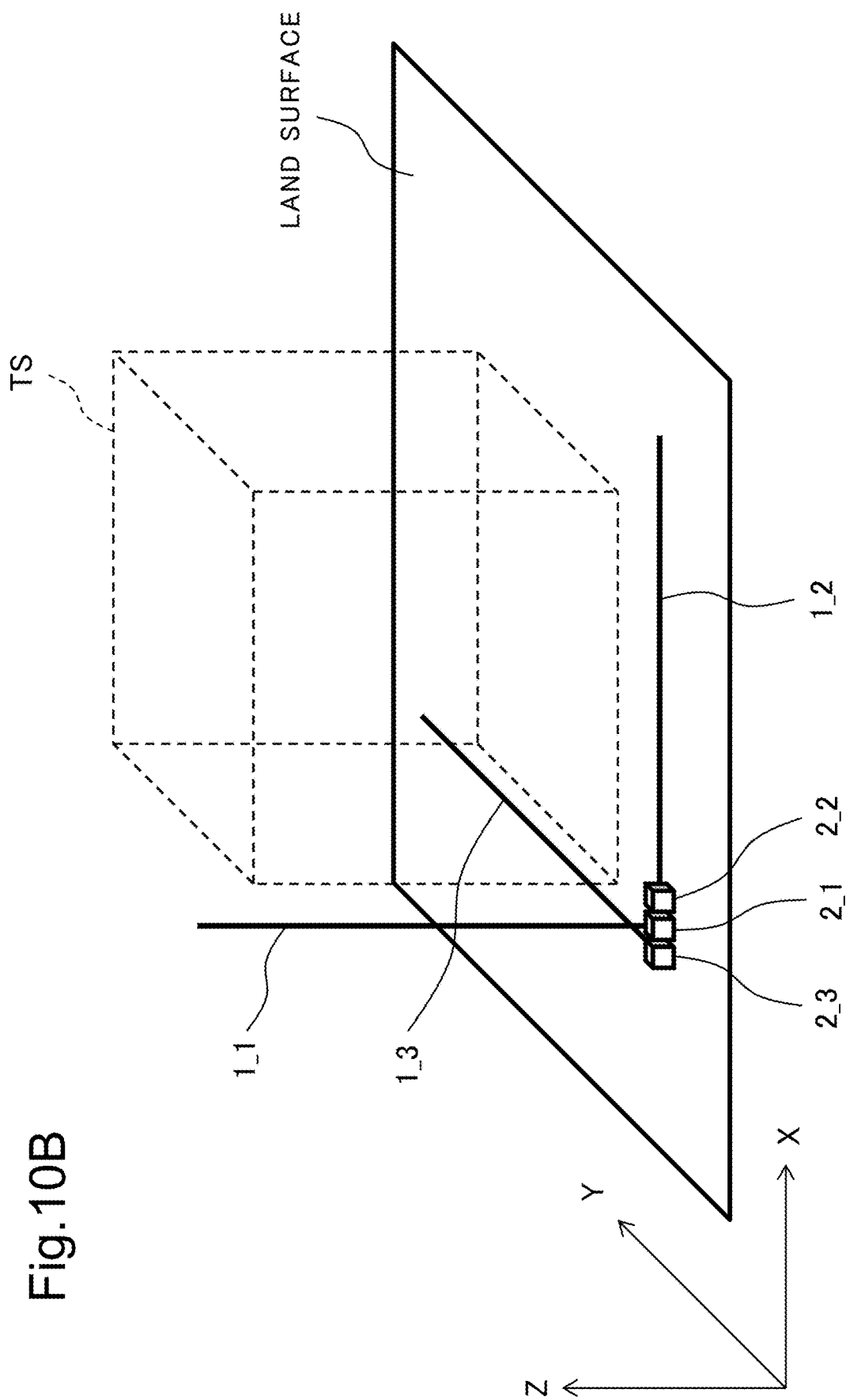

FIG. 1 is a block diagram illustrating main units of a spatial sensing system according to a first example embodiment. FIG. 2 is a block diagram illustrating main units of a spatial sensing device according to the first example embodiment. FIG. TOA is an illustrative diagram illustrating a specific example of a laying direction of one first optical fiber cable, a specific example of a laying direction of one second optical fiber cable, and the like. FIG. 10B is an illustrative diagram illustrating a specific example of a laying direction of one first optical fiber cable, a specific example of a laying direction of two second optical fiber cables, and the like. With reference to FIG. 1, FIG. 2, FIG. 10A, and FIG. 10B, the spatial sensing system according to the first example embodiment is described.

As illustrated in FIG. 1, a spatial sensing system 100 includes N optical fiber cables 1_1 to 1_N and M optical fiber sensing devices 2_1 to 2_M. Herein, each of N and M is an integer equal to or more than 2. In the example illustrated in FIG. 1, N=M is established, and the optical fiber sensing devices 2_1 to 2_M are corresponding to the optical fiber cables 1_1 to 1_N on a one-on-one basis. The spatial sensing system 100 includes a spatial sensing device 3 and an output device 4. The spatial sensing device 3 is freely communicable with an individual optical fiber sensing device 2 via a network NW.

At least one optical fiber cable 1 of the optical fiber cables 1_1 to 1_N is laid in such a way as to be directed along a direction departing from a land surface or a direction approaching the land surface (e.g., a direction orthogonal to the land surface). Hereinafter, such an optical fiber cable 1 may be referred to as a "first optical fiber cable". The direction may be referred to as a "first direction". A whole or substantially a whole of the first optical fiber cable may be laid in such a way as to be directed along the first direction or only a part of the first optical fiber cable may be laid in such a way as to be directed along the first direction. In other words, at least a part of the first optical fiber cable may be laid in such a way as to be directed along the first direction. For example, in the example illustrated in FIG. 10A or FIG. 10B, a whole of the optical fiber cable 1_1 is laid in a direction orthogonal to a land surface. In these examples, a direction orthogonal to the land surface is the first direction, and the optical fiber cable 1_1 is the first optical fiber cable.

In contrast, one or more remaining optical fiber cables 1 of the optical fiber cables 1_1 to 1_N are laid as follows. In other words, each of the one or more optical fiber cables 1 is laid in such a way as to be directed along a direction non-parallel to the first direction (e.g., a direction orthogonal to the first direction). The one or more optical fiber cables 1 may be laid in such a way as to be directed in directions different from each other (e.g., directions orthogonal to each other). Hereinafter, these optical fiber cables 1 may be collectively referred to as a "second optical fiber cable". These directions may be collectively referred to as a "second direction". A whole or substantially a whole of an individual second optical fiber cable may be laid in such a way as to be directed along a corresponding second direction or only a part of an individual second optical fiber cable may be laid in such a way as to be directed along a corresponding second direction. In other words, at least a part of an individual second optical fiber cable may be laid in such a way as to be directed along a corresponding second direction. For example, in the example illustrated in FIG. 10A or FIG. 10B, a whole of the optical fiber cable 1_2 is laid in a direction orthogonal to the first direction. In the example illustrated in FIG. 10B, a whole of the optical fiber cable 1_3 is laid in a direction orthogonal to the first direction and is laid in a direction orthogonal to the laying direction of the optical fiber cable 1_2. In these examples, a direction orthogonal to the first direction (i.e., a direction along the land surface) is the second direction, and each of the optical fiber cable 1_2 and the optical fiber cable 1_3 is the second optical fiber cable.

These laying directions are achieved, for example, as follows. In other words, the first optical fiber cable is laid, for example, in a high-rise building. At that time, a portion of the first optical fiber cable is laid in such a way as to be directed along a height direction of the high-rise building in a sidewall of the high-rise building. Thereby, the portion is laid in such a way as to be directed along a direction orthogonal to a land surface (i.e., the first direction). In contrast, an individual second optical fiber cable is, for example, laid on a plurality of steel towers (not illustrated) or in a plurality of power poles (not illustrated), or buried in ground. Thereby, substantially a whole of an individual second optical fiber cable is laid in such a way as to be directed along a direction along a land surface (i.e., the second direction). A specific example of an aspect of laying of the first optical fiber cable and a specific example of an aspect of laying of an individual second optical fiber cable are described later with reference to FIG. 7.

The first direction may be a direction departing from a land surface or a direction approaching the land surface, and is not limited to a direction orthogonal to the land surface. The second direction may be a direction non-parallel to the first direction and is not limited to a direction along the land surface. Each of the first direction and the second direction may be a direction oblique to the land surface. In other words, when the first direction is a direction orthogonal to the land surface, the second direction may be a direction along the land surface or a direction oblique to the land surface. In contrast, when the first direction is a direction oblique to the land surface, the second direction may be a direction along the land surface or another oblique direction to the land surface.

A direction departing from a land surface or a direction approaching the land surface is normally a vertical direction or a direction oblique to the vertical direction (hereinafter, referred to as a "vertical-oblique direction"). Therefore, the first direction is normally a vertical direction of a vertical-oblique direction. In contrast, a direction non-parallel to the first direction is normally a direction along a horizontal surface (hereinafter, referred to as a "horizontal direction") or another vertical-oblique direction. Therefore, the second direction is normally a horizontal direction or another vertical-oblique direction.

Hereinafter, an example in which the first direction is a direction orthogonal to a land surface and the second direction is a direction along the land surface is mainly described.

Herein, an individual optical fiber cable 1 can use optical fiber sensing. Specifically, for example, the individual optical fiber cable 1 can be used for detecting vibration, sound, or temperature based on distributed fiber optic sensing (DFOS). Hereinafter, data acquired by performing optical fiber sensing using an individual optical fiber cable 1 may be collectively referred to as "sensing data".

An individual optical fiber sensing device 2 performs optical fiber sensing (more specifically, DFOS) using a corresponding optical fiber cable 1 and thereby, acquires sensing data. The individual optical fiber sensing device 2 outputs the acquired sensing data.

The individual optical fiber sensing device 2 includes, for example, a distributed vibration sensing (DVS) device or a distributed acoustic sensing (DAS) device. Therefore, sensing data acquired by the individual optical fiber sensing device 2 are vibration data or acoustic data. In other words, the sensing data acquired by the individual optical fiber sensing device 2 are a distribution in a longitudinal direction of a corresponding optical fiber cable 1 and include a distribution of vibration intensity or acoustic intensity per frequency component.

As illustrated in FIG. 2, the spatial sensing device 3 includes a sensing data acquisition device 11, an object detection unit 12, and an output control unit 13.

The sensing data acquisition device 11 acquires sensing data output by an individual optical fiber sensing device 2. The sensing data are acquired, for example, via a network NW, from the individual optical fiber sensing device 2.

The object detection unit 12 detects, by using the sensing data acquired by the sensing data acquisition device 11, a location of a predetermined object (hereinafter, referred to as an "object") in a predetermined space (hereinafter, referred to as a "target space"). The target space is, for example, a two-dimensional space specified by one first optical fiber cable and one second optical fiber cable. Alternatively, the target space is, for example, a three-dimensional space specified by one first optical fiber cable and two second optical fiber cables. The object is a flying body (a drone during flight, a helicopter during flight, or the like) in a target space. Hereinafter, with reference to FIG. 10A and FIG. 10B, a specific example of the target space and a specific example of a detection method based on the object detection unit 12 are described.

<First Specific Example (See FIG. 10A)>

Now, a whole of one first optical fiber cable (11 in the figure) is laid in such a way as to be directed along a first direction (more specifically, a direction orthogonal to a land surface). A whole of one second optical fiber cable (1_2 in the figure) is laid in such a way as to be directed along a second direction (more specifically, a direction along the land surface). In other words, the one first optical fiber cable and the one second optical fiber cable are laid in such a way as to be orthogonal to each other.

Herein, a laying location of one first optical fiber cable and a laying location of one second optical fiber cable are known. The object detection unit 12 previously stores information indicating these laying locations. Alternatively, the object detection unit 12 acquires information indicating these laying locations. The object detection unit 12 sets, by using the information, a coordinate space as described below. In other words, the object detection unit 12 sets a virtual coordinate space including a first axis corresponding to a longitudinal direction (laying direction) of the one first optical fiber cable and a second axis corresponding to a longitudinal direction (laying direction) of the one second optical fiber cable. A target space (TS in the figure) according to the first specific example is a two-dimensional space corresponding to the coordinate space.

Hereinafter, a coordinate value (z) for a first axis of coordinate values (x, z) in the set coordinate space may be referred to as a "first coordinate value". A coordinate value (x) for a second axis of the coordinate values (x, z) may be referred to as a "second coordinate value".

Sensing data acquired based on DFOS using one first optical fiber cable include a distribution for a longitudinal direction of the one first optical fiber cable, the distribution being a distribution of vibration intensity or acoustic intensity per frequency component. The object detection unit 12 detects, by using the sensing data, the following location for a frequency component corresponding to vibration or sound which may be generated based on flight of a flying body. In other words, the object detection unit 12 detects a location for the longitudinal direction, the location being a location corresponding to a maximum vibration intensity or acoustic intensity or a location corresponding to a vibration intensity or acoustic intensity of a predetermined value or more. The object detection unit 12 plots, on the first axis of the set coordinate space, a point corresponding to the detected location. In this manner, a first coordinate value (z) corresponding to the detected location is calculated.

In contrast, sensing data acquired based on DFOS using one second optical fiber cable include a distribution for a longitudinal direction of the one second optical fiber cable, the distribution being a distribution of vibration intensity or acoustic intensity per frequency component. The object detection unit 12 detects, by using the sensing data, the following location for a frequency component corresponding to vibration or sound which may be generated based on flight of a flying body. In other words, the object detection unit 12 detects a location for the longitudinal direction, the location being a location corresponding to a maximum vibration intensity or acoustic intensity or a location corresponding to a vibration intensity or acoustic intensity of a predetermined value or more. The object detection unit 12 plots, on the second axis of the set coordinate space, a point corresponding to the detected location. In this manner, a second coordinate value (x) corresponding to the detected location is calculated.

The coordinate values (x, z) calculated in this manner have a high probability corresponding to a location of a flying body in a target space. Therefore, the coordinate values (x, z) are calculated, and thereby a location of a flying body in a target space can be detected.

<Second Specific Example (See FIG. 10B)>

Now, a whole of one first optical fiber cable (11 in the figure) is laid in such a way as to be directed along a first direction (more specifically, a direction orthogonal to a land surface). A whole of one second optical fiber cable (1_2 in the figure) is laid in such a way as to be directed along a second direction (more specifically, a direction along the land surface). Moreover, a whole of another second optical fiber cable (1_3 in the figure) is laid in such a way as to be directed along another second direction (more specifically, another direction along the land surface). Herein, the two second optical fiber cables are laid in such a way as to be directed along directions orthogonal to each other. In other words, the one first optical fiber cable and the two second optical fiber cables are laid in such a way as to be orthogonal to each other.

Herein, a laying location of the one first optical fiber cable and each of laying locations of the two second optical fiber cables are known. The object detection unit 12 previously stores information indicating these laying locations. Alternatively, the object detection unit 12 acquires information indicating these laying locations. The object detection unit 12 sets, by using the information, the following coordinate space. In other words, the object detection unit 12 sets a virtual coordinate space including a first axis corresponding to a longitudinal direction (laying direction) of one first optical fiber cable, a second axis corresponding to a longitudinal direction (laying direction) of one second optical fiber cable, and a third axis corresponding to a longitudinal direction (laying direction) of another second optical fiber cable. A target space (TS in the figure) according to the second specific example is a three-dimensional space corresponding to the coordinate space.

Hereinafter, a coordinate value (z) for the first axis of coordinate values (x, y, z) in the set coordinate space may be referred to as a "first coordinate value". A coordinate value (x) for the second axis of these coordinate values (x, y, z) may be referred to as a "second coordinate value". Moreover, a coordinate value (y) for the third axis of these coordinate values (x, y, z) may be referred to as a "third coordinate value".

Sensing data acquired based on DFOS using one first optical fiber cable include a distribution for a longitudinal direction of the one first optical fiber cable, the distribution being a distribution of vibration intensity or acoustic intensity per frequency component. The object detection unit 12 detects, by using the sensing data, the following location for a frequency component corresponding to vibration or sound which may be generated based on flight of a flying body. In other words, the object detection unit 12 detects a location for the longitudinal direction, the location being a location corresponding to a maximum vibration intensity or acoustic intensity or a location corresponding to a vibration intensity or acoustic intensity of a predetermined value or more. The object detection unit 12 plots, on the first axis of the set coordinate space, a point corresponding to the detected location. In this manner, a first coordinate value (z) corresponding to the detected location is calculated.

In contrast, sensing data acquired based on DFOS using one second optical fiber cable include a distribution for a longitudinal direction of the one second optical fiber cable, the distribution being a distribution of vibration intensity or acoustic intensity per frequency component. The object detection unit 12 detects, by using the sensing data, the following location for a frequency component corresponding to vibration or sound which may be generated based on flight of a flying body. In other words, the object detection unit 12 detects a location for the longitudinal direction, the location being a location corresponding to a maximum vibration intensity or acoustic intensity or a location corresponding to a vibration intensity or acoustic intensity of a predetermined value or more. The object detection unit 12 plots, on the second axis of the set coordinate space, a point corresponding to the detected location. In this manner, a second coordinate value (x) corresponding to the detected location is calculated.

Moreover, sensing data acquired based on DFOS using another second optical fiber cable include a distribution for a longitudinal direction of the another second optical fiber cable, the distribution being a distribution of vibration intensity or acoustic intensity per frequency component. The object detection unit 12 detects, by using the sensing data, the following location for a frequency component corresponding to vibration or sound which may be generated based on flight of a flying body. In other words, the object detection unit 12 detects a location for the longitudinal direction, the location being a location corresponding to a maximum vibration intensity or acoustic intensity or a location corresponding to a vibration intensity or acoustic intensity of a predetermined value or more. The object detection unit 12 plots, on the third axis of the set coordinate space, a point corresponding to the detected location. In this manner, a third coordinate value (y) corresponding to the detected location is calculated.

The coordinate values (x, y, z) calculated in this manner have high probability corresponding to a location of a flying body in a target space. Therefore, the coordinate values (x, y, z) are calculated, and thereby a location of a flying body in a target space can be detected.

As described above, only a part of the first fiber cable may be laid in such a way as to be directed along a first direction. In this case, the object detection unit 12 may use, when calculating a first coordinate value (z), only sensing data corresponding to the part in sensing data acquired by using the first optical fiber cable.

As described above, only a part of an individual second optical fiber cable may be laid in such a way as to be directed along a corresponding second direction. In this case, the object detection unit 12 may use, when calculating a second coordinate value (x) or a third coordinate value (y), only sensing data corresponding to the part in sensing data acquired by using a corresponding second optical fiber cable.

Figure 11A:
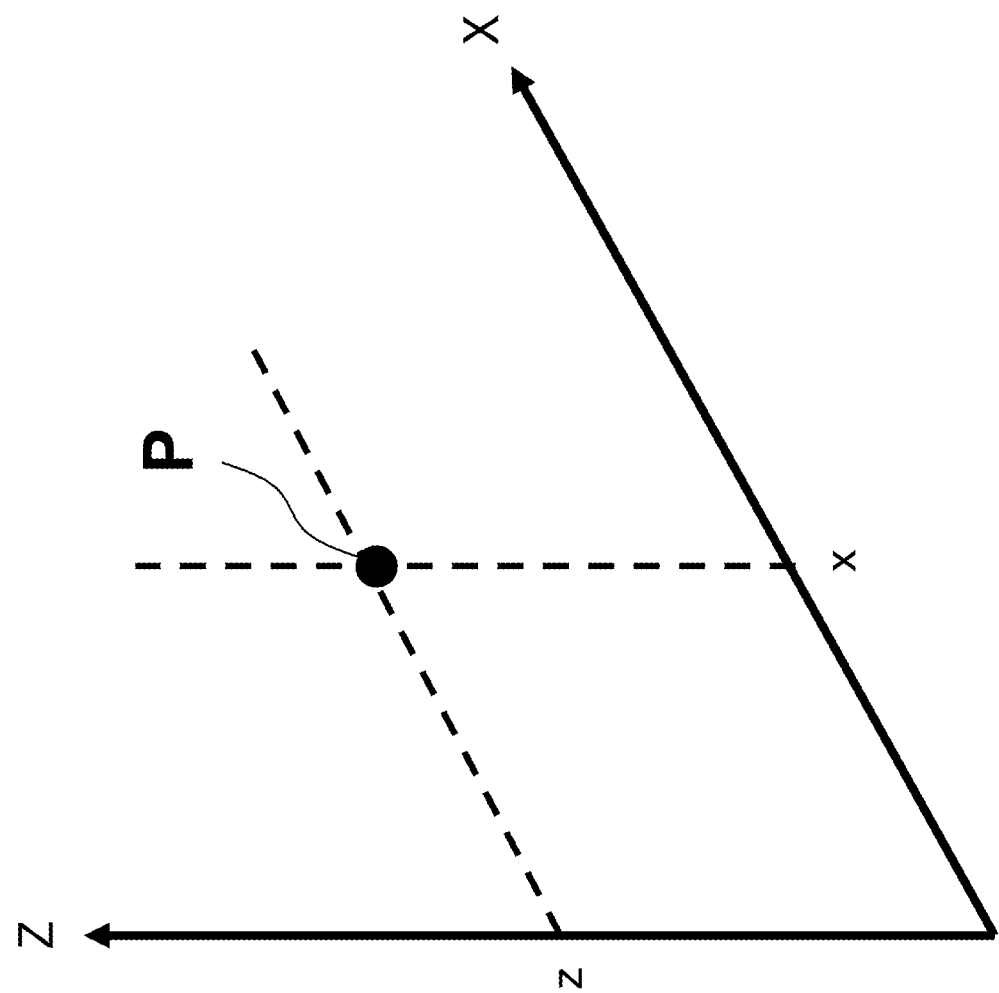
FIG. 11A is an illustrative diagram illustrating an example of coordinate values indicating a location in a normal oblique coordinate system.
Figure 11B:
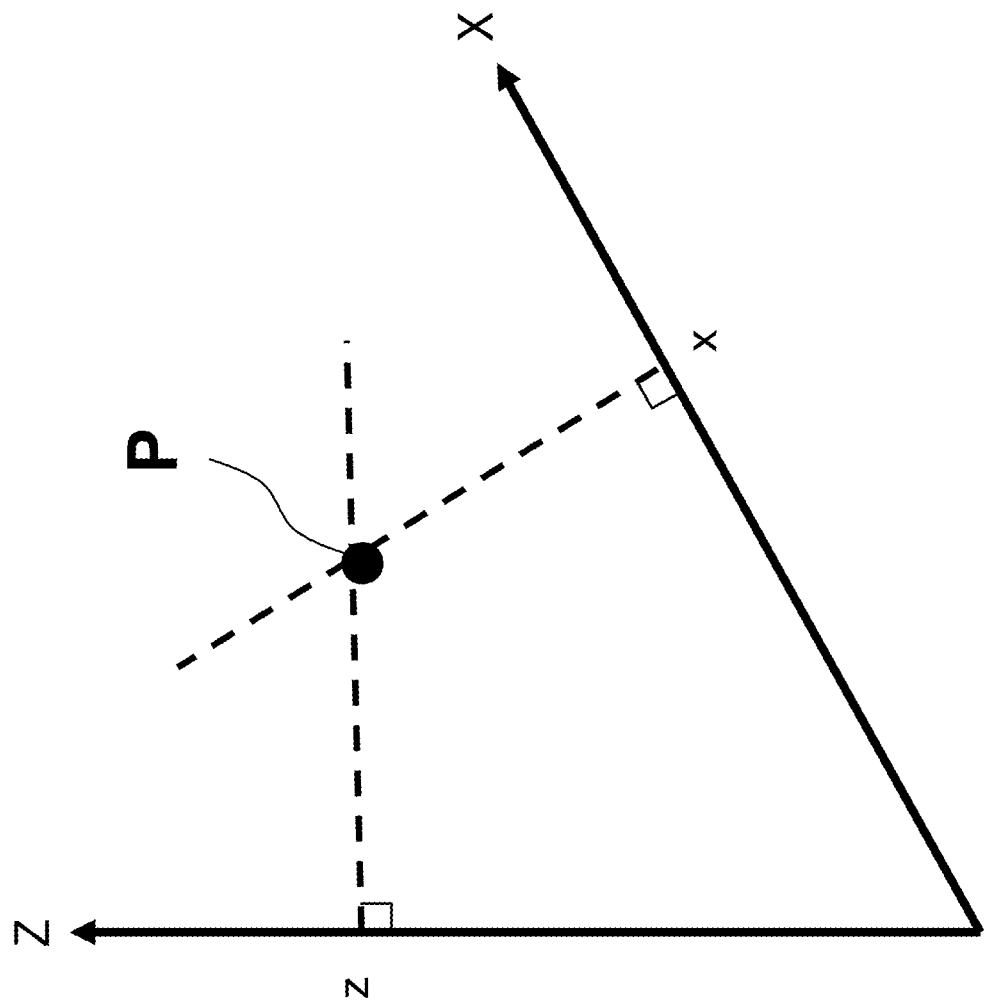
FIG. 11B is an illustrative diagram illustrating an example of coordinate values calculated by an object detection unit in the spatial sensing device according to the first example embodiment.

Moreover, as described above, the first direction may be a direction departing from a land surface or a direction approaching the land surface and is not limited to a direction orthogonal to the land surface. The individual second direction may be a direction non-parallel to the first direction and is not limited to a direction along the land surface. Therefore, the first direction and the individual second direction may be non-orthogonal to each other. In addition, two second directions according to the second specific example may be non-orthogonal to each other. In other words, a coordinate space set in the object detection unit 12 is not limited to an orthogonal coordinate system and may be a non-orthogonal coordinate system. In this case, coordinate values calculated by the object detection unit 12 are different from coordinate values (see, for example, FIG. 11A) indicating a location P in a normal oblique coordinate system and are coordinate values (see, for example, FIG. 11B) indicating, among points on each axis, a point in which a distance from a location P of an object is minimum.

The output control unit 13 outputs information (which may be hereinafter referred to as "location information") indicating a location detected by the object detection unit 12. The location information includes, for example, the calculated coordinate values (x, z) or the calculated coordinate values (x, y, z). In order to output the location information, the output device 4 is used (see FIG. 1). The output device 4 includes, for example, at least one of a display device, a voice output device, or a communication device. The display device uses, for example, a display. The voice output device uses, for example, a speaker. The communication device uses, for example, a dedicated transmitter and a dedicated receiver.

Specifically, the output control device 13 executes control for displaying an image corresponding to location information. In order to display the image, a display device in the output device 4 is used. The displayed image may be, for example, an image including a number indicating the calculated coordinate values (x, z) or a number indicating the calculated coordinate values (x, y, z). Alternatively, the display image is, for example, an image in which a point or an icon indicating a flying body is superimposed on a location corresponding to the calculated coordinate values (x, z) in a background indicating a two-dimensional space being a target space. Alternatively, the display image is, for example, an image in which a point or an icon indicating a flying body is superimposed on a location corresponding to the calculated coordinate values (x, y, z) in a background indicating a three-dimensional space being a target space. In addition, the display image may be, for example, any image when the image is corresponding to location information.

Alternatively, the output control unit 13 executes, for example, control for outputting a voice corresponding to location information. In order to output the voice, a voice output device in the output device 4 is used.

Alternatively, the output control unit 13 executes, for example, control for transmitting a signal corresponding to location information. In order to transmit the signal, a communication device in the output device 4 is used. The signal is transmitted, for example, to another system (not illustrated). Specifically, the signal is transmitted, for example, to a system for monitoring a flying body or a system for managing an operation of a flying body. In addition, the signal may be transmitted to any system when the system is a system using location information.

In this manner, main units of the spatial sensing system 100 are configured.

Hereinafter, the sensing data acquisition device 11 may be referred to as a "sensing data acquisition means". The object detection unit 12 may be referred to as an "object detection means". Moreover, the output control unit 13 may be referred to as an "output control means".

Figure 3:
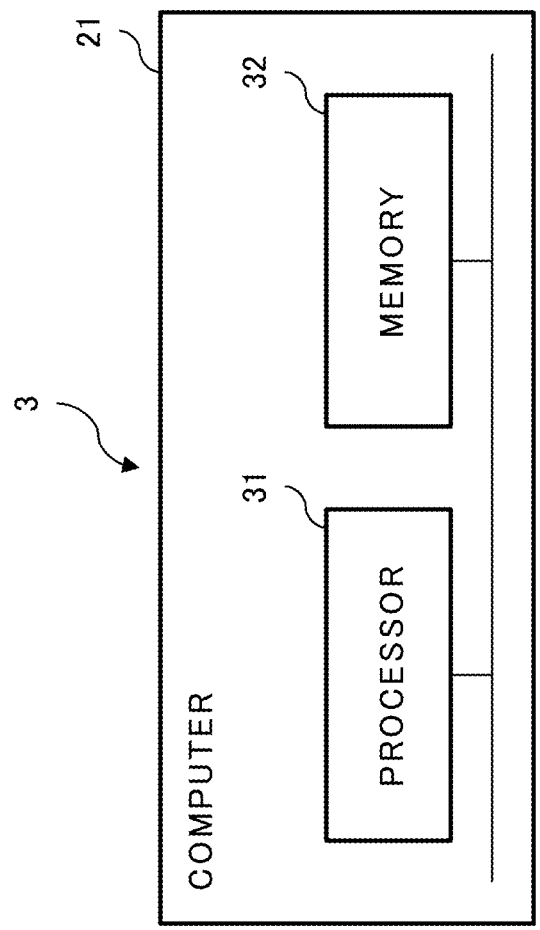
FIG. 3 is a block diagram illustrating a hardware configuration of main units of the spatial sensing device according to the first example embodiment.
Figure 4:
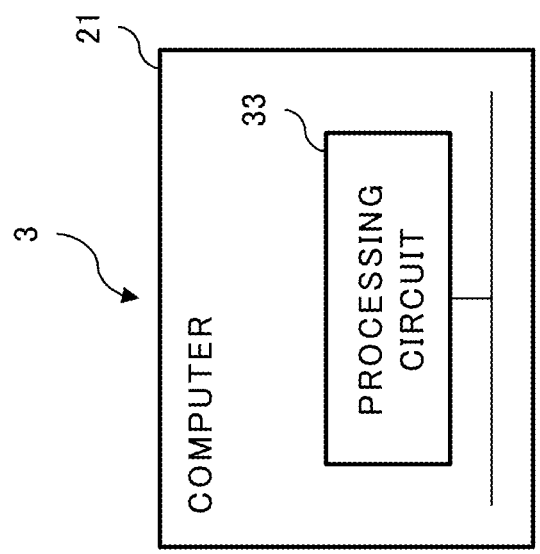
FIG. 4 is another hardware configuration of main units of the spatial sensing device according to the first example embodiment.
Figure 5:
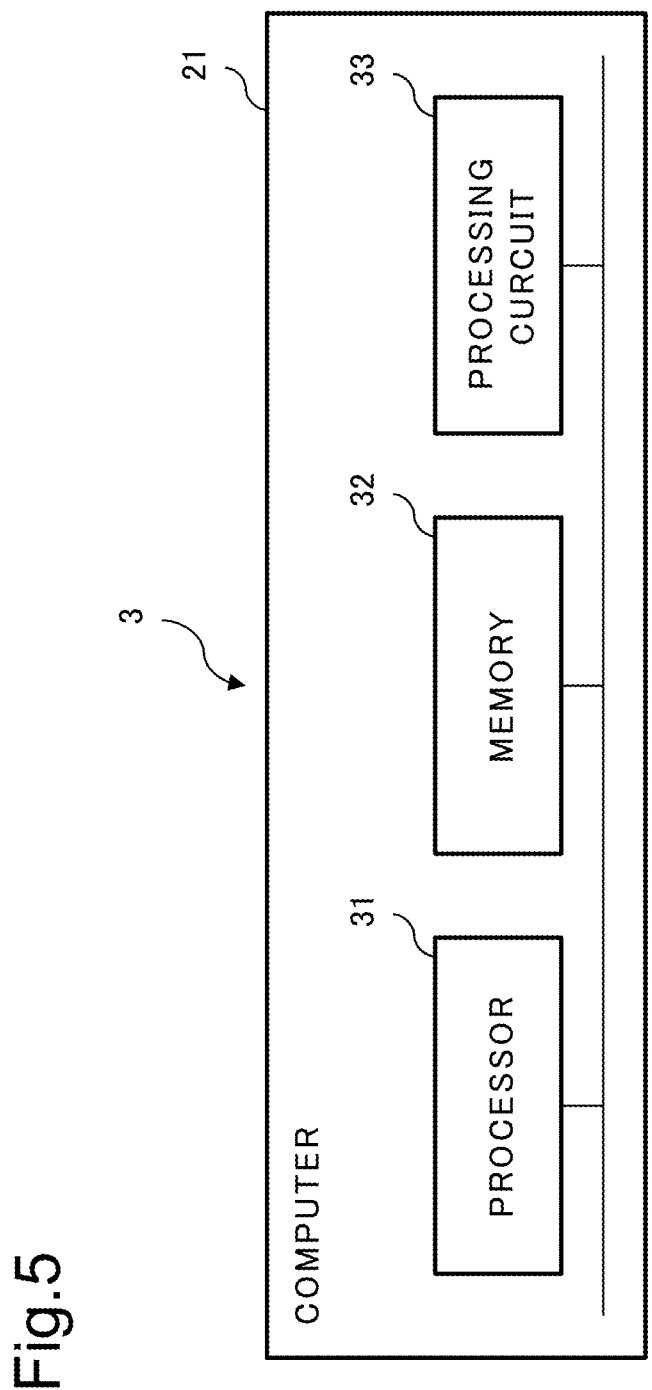
FIG. 5 is another hardware configuration of main units of the spatial sensing device according to the first example embodiment.

Next, with reference to FIG. 3 to FIG. 5, a hardware configuration of main units of the spatial sensing device 3 is described.

As illustrated in each of FIG. 3 to FIG. 5, the spatial sensing device 3 uses a computer 21.

As illustrated in FIG. 3, the computer 21 includes a processor 31 and a memory 32. The memory 32 stores a program for causing the computer 21 to function as the sensing data acquisition device 11, the object detection unit 12, and the output control unit 13. The processor 31 reads and executes the program stored in the memory 32. Thereby, a function F1 of the sensing data acquisition device 11, a function F2 of the object detection unit 12, and a function F3 of the output control unit 13 are achieved.

Alternatively, as illustrated in FIG. 4, the computer 21 includes a processing circuit 33. The processing circuit 33 executes processing of causing the computer 21 to function as the sensing data acquisition device 11, the object detection unit 12, and the output control unit 13. Thereby, the functions F1 to F3 are achieved.

Alternatively, as illustrated in FIG. 5, the computer 21 includes the processor 31, the memory 32, and the processing circuit 33. In this case, a partial function of the functions F1 to F3 is achieved by the processor 31 and the memory 32, and a remaining function of the functions F1 to F3 is achieved by the processing circuit 33.

The processor 31 includes one or more processors. An individual processor uses, for example, a central processing unit (CPU), a graphics processing unit (GPU), a microprocessor, a microcontroller, or a digital signal processor (DSP).

The memory 32 includes one or more memories. An individual memory uses, for example, a random access memory (RAM), a read only memory (ROM), a flash memory, an erasable programmable read only memory (EPROM), an electrically erasable programmable read only memory (EEPROM), a solid state drive, a hard disk drive, a flexible disk, a compact disc, a digital versatile disc (DVD), a Blu-ray disc, a magneto optical (MO) disc, or a mini disk.

The processing circuit 33 includes one or more processing circuits. An individual processing circuit uses, for example, an application specific integrated circuit (ASIC), a programmable logic device (PLD), a field programmable gate array (FPGA), a system on a chip (SoC), or a system large scale integrator (LSI).

The processor 31 may include a dedicated processor corresponding to each of the functions F1 to F3. The memory 32 may include a dedicated memory corresponding to each of the functions F1 to F3. The processing circuit 33 may include a dedicated processing circuit corresponding to each of the functions F1 to F3.

Figure 6:
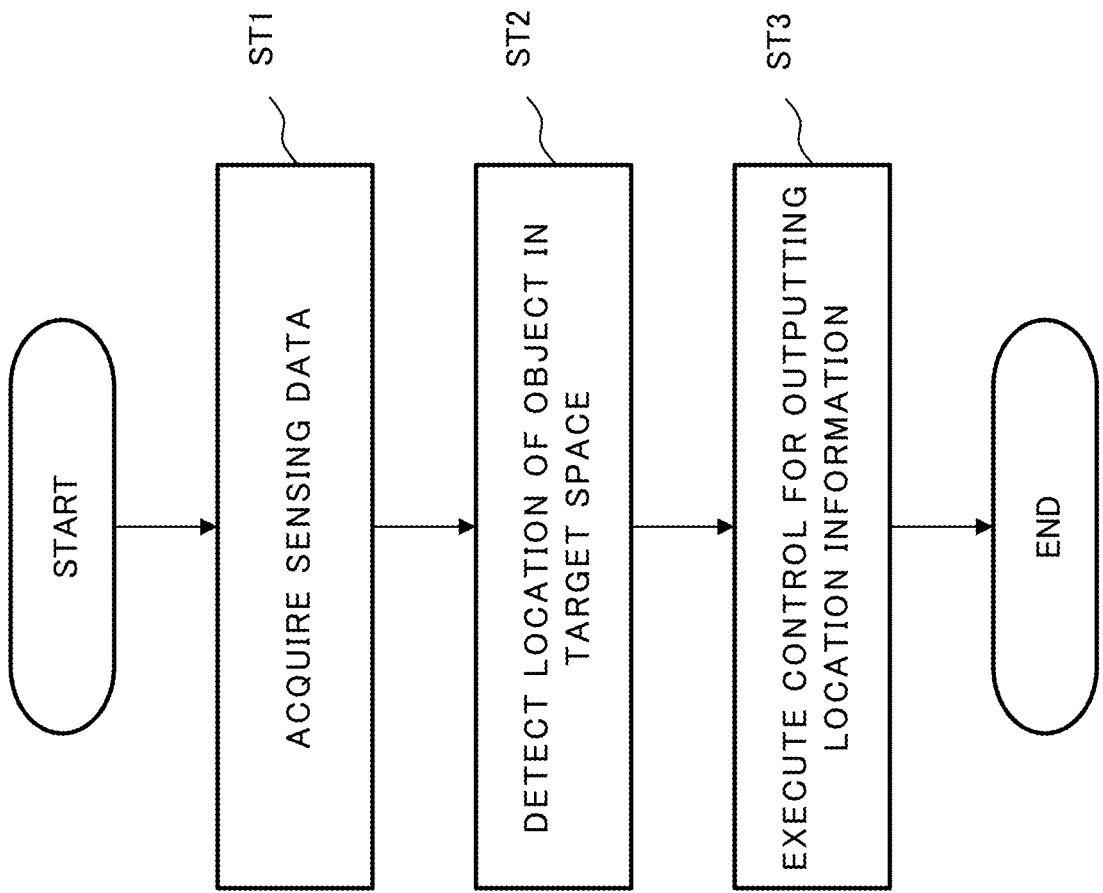
FIG. 6 is a flowchart illustrating an operation of the spatial sensing device according to the first example embodiment.

Next, with reference to a flowchart illustrated in FIG. 6, an operation of the spatial sensing device 3 is described.

First, the sensing data acquisition device 11 acquires sensing data (step ST1). Then, the object detection unit 12 detects, by using the sensing data acquired in step ST1, a location of an object in a target space (step ST2). A specific example of a detection method based on the object detection unit 12 is as described already. Therefore, re-description is omitted. Then, the output control unit 13 executes control for outputting information (i.e. location information) indicating the location detected in step ST2 (step ST3).

Figure 7:
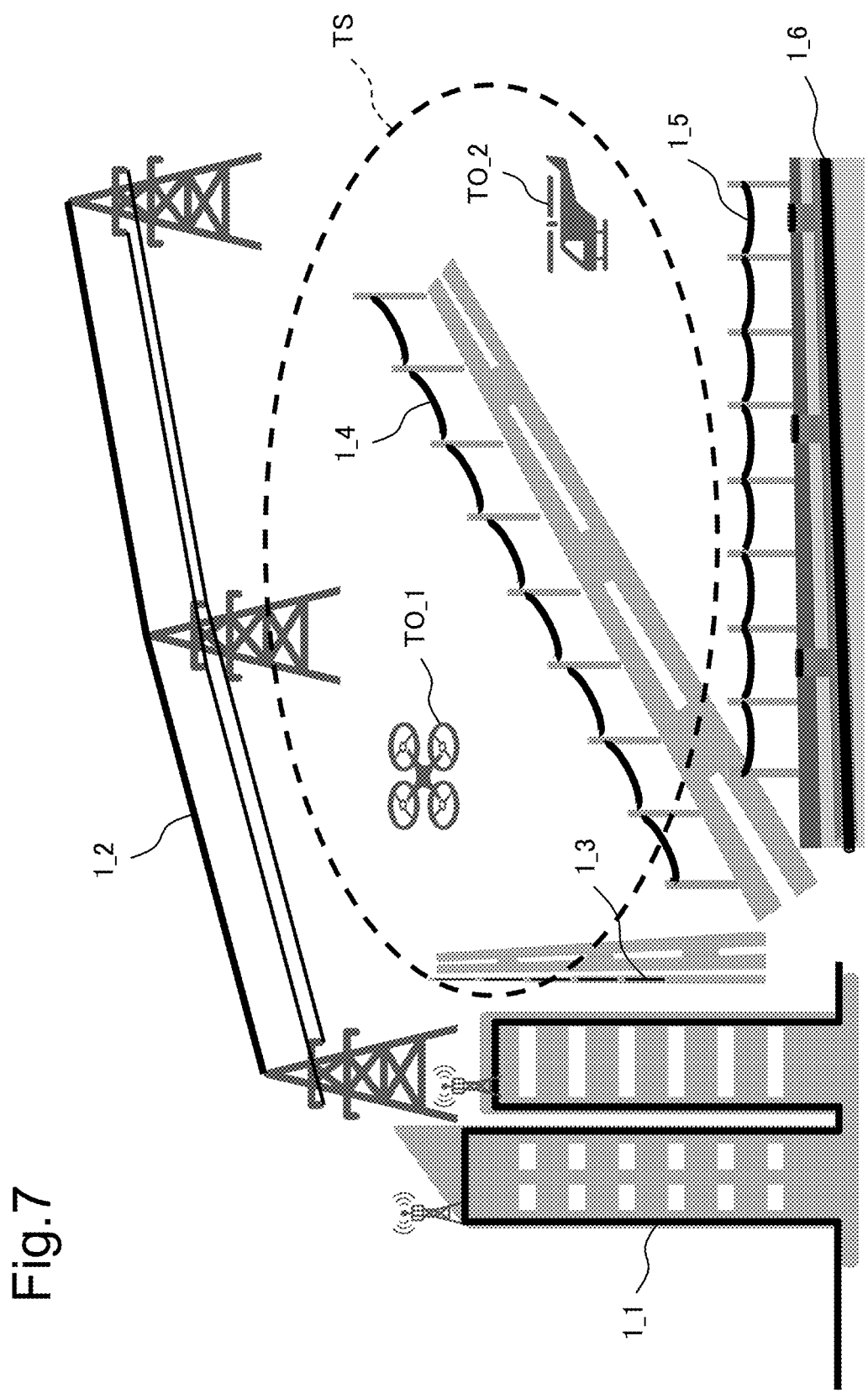

Next, with reference to FIG. 7, a specific example of an aspect of laying of a first optical fiber cable, a specific example of an aspect of laying an individual second optical fiber cable, and the like are described.

In the figure, an optical fiber cable 11 is a first optical fiber cable. As illustrated in FIG. 7, the optical fiber cable 1_1 is laid in a high-rise building. Herein, a portion of the optical fiber cable 1_1 is laid in such a way as to be directed along a height direction of the high-rise building in a side wall of the high-rise building. Thereby, the portion is laid in such a way as to be directed along a direction (a first direction) orthogonal to a land surface.

However, a remaining portion of the optical fiber cable 1_1 is laid in parallel to the land surface in a head top of the high-rise building or on a peripheral land surface of the high-rise building. In other words, the portion is laid in such a way as to be directed along a direction different from the first direction. As described above, at least a part of the first optical fiber cable may be laid in such a way as to be directed along the first direction. A location where the optical fiber cable is laid is known. Therefore, the object detection unit 12 may use only sensing data corresponding to a portion laid in such a way as to be directed along the first direction in sensing data acquired by using the first optical fiber cable.

In the figure, each of optical fiber cables 1_2 to 1_6 is a second optical fiber cable. As illustrated in FIG. 7, the optical fiber cable 1_2 is installed in a plurality of steel towers (more specifically, a plurality of power transmission steel towers or a plurality of power distribution steel towers). The optical fiber cable 12 may use optical ground wire (OPGW). Each of the optical fiber cables 1_3 to 1_5 is laid on a plurality of power poles. The optical fiber cable 1_6 is buried in ground. More specifically, the optical fiber cable 1_6 is laid in such a way as to be directed along a longitudinal direction in an underground tube. In this manner, substantially a whole of each of the optical fiber cables 1_2 to 1_6 is laid in such a way as to be directed along a direction along the land surface (i.e., the second direction).

In the figure, each of a TO_1 and a TO_2 indicates a specific example of an object. As described above, the object is, for example, a flying body in a target space TS. More specifically, the object is a drone (TO_1) during flight in a target space TS, a helicopter (TO_2) during flight in the target space (TS), or he like.

Next, an advantageous effect achieved by using the spatial sensing system 100 is described.

As described above, by using sensing data acquired by using a first optical fiber cable and sensing data acquired by using a second optical fiber cable are used, and thereby a location of an object in a target space (a two-dimensional space or a three-dimensional space) can be detected. In other words, by using sensing data acquired by using a plurality of optical fiber cables 1 laid in directions different from each other, spatial sensing can be achieved.

In particular, by using sensing data acquired by using a first optical fiber cable, a location of an object in a height direction (e.g., a vertical direction) can be detected. Thereby, for example, as illustrated in FIG. 7, a location of a flying body in a space away from a land surface (i.e., in midair) can be detected.

Next, a modified example of the spatial sensing system 100 is described.

An association relation between optical fiber cables 1_1 to 1_N and optical fiber sensing devices 21 to 2_M is not limited to a one-on-one basis. In other words, N≠M may be established. An individual optical fiber sensing device 2 may perform optical fiber sensing using two or more optical fiber cables 1 of the optical fiber cables 1_1 to 1_N. The optical fiber sensing devices 21 to 2_M may be installed in the same location or may be installed in locations different from each other.

The spatial sensing system 100 may include, instead of M optical fiber sensing devices 21 to 2_M, one optical fiber sensing device 2. In this case, the one optical fiber sensing device 2 may perform optical fiber sensing using each of N optical fiber cables 1_1 to 1_N.

An object is a physical object that can be present in a target space and may be a physical object capable of generating vibration or sound. In other words, the object is not limited to a flying body. The object may be, for example, a bird. More specifically, the object may be a bird which collides with a high-rise building or a bird which builds a nest in a steel tower.

A detection method based on the object detection unit 12 is not limited to the first specific example or the second specific example. The detection method based on the object detection unit 12 may detect, based on a distribution of vibration intensity or acoustic intensity for a plurality of directions, a location of an object in a two-dimensional space or a three-dimensional space.

Herein, in order to achieve the detection, the number of first optical fiber cables is not limited to one. The object detection unit 12 may calculate, for example, by using sensing data acquired by each of two or more first optical fiber cables, first coordinate values (z) and calculate a statistical value (e.g., an average value or a median) based on these first coordinate values (z). The object detection unit 12 may use the calculated statistical value as a value indicating a location of an object for a first direction.

In order to achieve the detection, the number of second optical fiber cables is not limited to one or two. The object detection unit 12 calculates, for example, with respect to two or more second optical fiber cables (optical fiber cables 1_5, 1_6, and the like illustrated in FIG. 7) laid in such a way as to be directed along the same second direction, a second coordinate value (x) or a third coordinate value (y), by using sensing data acquired by each of the two or more second optical fiber cables. The object detection unit 12 calculates a statistical value (same as above) based on the calculated second coordinate value (x) or a statistical value (same as above) based on the calculated third coordinate value (y). The object detection unit 12 may use the calculated statistical value as a value indicating a location of an object for an individual second direction.

Figure 8:
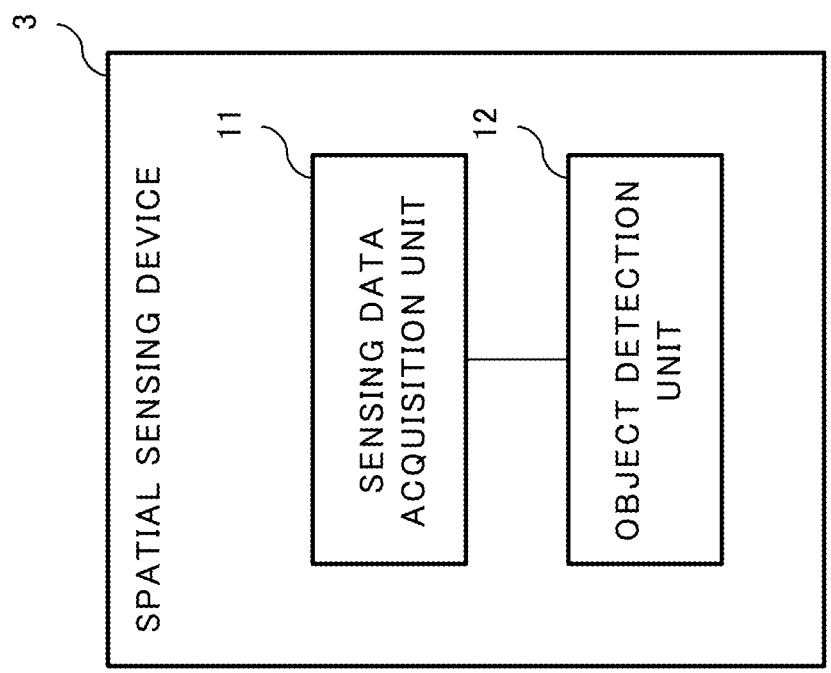
FIG. 8 is a block diagram illustrating main units of another spatial sensing device according to the first example embodiment.

Next, with reference to FIG. 8, a modified example of the spatial sensing device 3 is described. Further, with reference to FIG. 9, another modified example of the spatial sensing system 100 is described.

As illustrated in FIG. 8, the spatial sensing device 3 may include a sensing data acquisition device 11 and an object detection unit 12. In other words, main units of the spatial sensing device 3 may be configured by using the sensing data acquisition device 11 and the object detection unit 12. In this case, the output control unit 13 may be provided outside the spatial sensing device 3.

Figure 9:
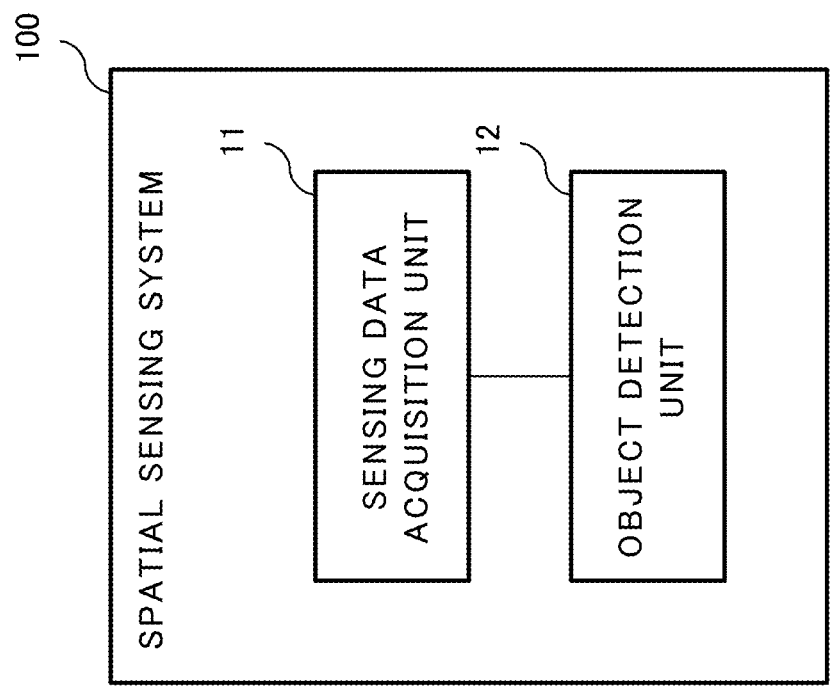
FIG. 9 is a block diagram illustrating main units of another spatial sensing device according to the first example embodiment.

As illustrated in FIG. 9, the spatial sensing system 100 may include a sensing data acquisition device 11 and an object detection unit 12. In other words, main units of the spatial sensing system 100 may be configured by using the sensing data acquisition device 11 and the object detection unit 12. In this case, optical fiber cables 1_1 to 1_N, optical fiber sensing devices 2_1 to 2_M, and the output device 4 may be disposed outside the spatial sensing system 100. The output control unit 13 may be disposed outside the spatial sensing system 100.

Even in these cases, an advantageous effect as described above can be exhibited. In other words, the sensing data acquisition device 11 acquires sensing data based on optical fiber sensing using a plurality of optical fiber cables 1 (not illustrated in FIG. 8 or FIG. 9) laid in directions different from each other. The object detection unit 12 detects, by using the sensing data, a location of an object in a target space. Thereby, an object in a two-dimensional space or a three-dimensional space can be detected. In other words, spatial sensing can be achieved.

The spatial sensing system 100 may include, in addition to the sensing data acquisition device 11 and the object detection unit 12, an output control unit 13. Units of the spatial sensing system 100 may be configured by using independent devices. These devices may be distributed on a geographical or network basis. These devices may include, for example, an edge computer and a cloud computer.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

[Supplementary Note 1]

A spatial sensing device including:
- a sensing data acquisition means for acquiring sensing data based on optical fiber sensing using a plurality of optical fiber cables laid in directions different from one another; and
- an object detection means for detecting, by using the sensing data, a location of an object in a target space.

[Supplementary Note 2]

The spatial sensing device according to supplementary note 1, wherein
- the plurality of optical fiber cables include at least one first optical fiber cable laid in a first direction being a direction departing from a land surface or a direction approaching the land surface and at least one second optical fiber cable laid in a second direction being a direction non-parallel to the first direction.

[Supplementary Note 3]

The spatial sensing device according to supplementary note 2, wherein
- the target space is a two-dimensional space corresponding to a coordinate space including a first axis corresponding to the first direction and a second axis corresponding to the second direction, and
- the object detection means detects, by using the sensing data, a location of the object in the two-dimensional space.

[Supplementary Note 4]

The spatial sensing device according to supplementary note 2, wherein
- the target space is a three-dimensional space corresponding to a coordinate space including a first axis corresponding to the first direction and a second axis and a third axis corresponding to the second directions different from each other, and the object detection means detects, by using the sensing data, a location of the object in the three-dimensional space.

[Supplementary Note 5]

The spatial sensing device according to any one of supplementary notes 2 to 4, wherein the first optical fiber cable is laid in a height direction of a high-rise building.

[Supplementary Note 6]

The spatial sensing device according to any one of supplementary notes 2 to 5, wherein the second optical fiber cable is laid on a plurality of steel towers or a plurality of power poles or is buried in ground.

[Supplementary Note 7]

The spatial sensing device according to any one of supplementary notes 1 to 6, wherein the object is a flying body or a bird.

[Supplementary Note 8]

The spatial sensing device according to any one of supplementary notes 1 to 7, wherein information indicating a location of the object is output.

[Supplementary Note 9]

A spatial sensing system including:

a sensing data acquisition means for acquiring sensing data based on optical fiber sensing using a plurality of optical fiber cables laid in directions different from one another; and an object detection means for detecting, by using the sensing data, a location of an object in a target space.

[Supplementary Note 10]

The spatial sensing system according to supplementary note 9, wherein the plurality of optical fiber cables include at least one first optical fiber cable laid in a first direction being a direction departing from a land surface or a direction approaching the land surface and at least one second optical fiber cable laid in a second direction being a direction non-parallel to the first direction.

[Supplementary Note 11]

The spatial sensing system according to supplementary note 10, wherein the target space is a two-dimensional space corresponding to a coordinate space including a first axis corresponding to the first direction and a second axis corresponding to the second direction, and the object detection means detects, by using the sensing data, a location of the object in the two-dimensional space.

[Supplementary Note 12]

The spatial sensing system according to supplementary note 10, wherein the target space is a three-dimensional space corresponding to a coordinate space including a first axis corresponding to the first direction and a second axis and a third axis corresponding to the second directions different from each other, and the object detection means detects, by using the sensing data, a location of the object in the three-dimensional space.

[Supplementary Note 13]

The spatial sensing system according to any one of supplementary notes 10 to 12, wherein the first optical fiber cable is laid in a height direction of a high-rise building.

[Supplementary Note 14]

The spatial sensing system according to any one of supplementary notes 10 to 13, wherein the second optical fiber cable is laid on a plurality of steel towers or a plurality of power poles or is buried in ground.

[Supplementary Note 15]

The spatial sensing system according to any one of supplementary notes 9 to 14, wherein the object is a flying body or a bird.

[Supplementary Note 16]

The spatial sensing system according to any one of supplementary notes 9 to 15, wherein information indicating a location of the object is output.

[Supplementary Note 17]

A spatial sensing method including:

acquiring, by a sensing data acquisition means, sensing data based on optical fiber sensing using a plurality of optical fiber cables laid in directions different from one another; and detecting, by an object detection means, by using the sensing data, a location of an object in a target space.

[Supplementary Note 18]

The spatial sensing method according to supplementary note 17, wherein the plurality of optical fiber cables include at least one first optical fiber cable laid in a first direction being a direction departing from a land surface or a direction approaching the land surface and at least one second optical fiber cable laid in a second direction being a direction non-parallel to the first direction.

[Supplementary Note 19]

The spatial sensing method according to supplementary note 18, wherein the target space is a two-dimensional space corresponding to a coordinate space including a first axis corresponding to the first direction and a second axis corresponding to the second direction, and the object detection means detects, by using the sensing data, a location of the object in the two-dimensional space.

[Supplementary Note 20]

The spatial sensing method according to supplementary note 18, wherein the target space is a three-dimensional space corresponding to a coordinate space including a first axis corresponding to the first direction and a second axis and a third axis corresponding to the second directions different from each other, and the object detection means detects, by using the sensing data, a location of the object in the three-dimensional space.

[Supplementary Note 21]

The spatial sensing method according to any one of supplementary notes 18 to 20, wherein the first optical fiber cable is laid in a height direction of a high-rise building.

[Supplementary Note 22]

The spatial sensing method according to any one of supplementary notes 18 to 21, wherein the second optical fiber cable is laid on a plurality of steel towers or a plurality of power poles or is buried in ground.

[Supplementary Note 23]

The spatial sensing method according to any one of supplementary notes 17 to 22, wherein the object is a flying body or a bird.

[Supplementary Note 24]
The spatial sensing method according to any one of supplementary notes 17 to 23, wherein information indicating a location of the object is output.
[Supplementary Note 25]
A recording medium recording a program for causing a computer to function as:
a sensing data acquisition means for acquiring sensing data based on optical fiber sensing using a plurality of optical fiber cables laid in directions different from one another; and
an object detection means for detecting, by using the sensing data, a location of an object in a target space.
[Supplementary Note 26]
The recording medium according to supplementary note 25, wherein
the plurality of optical fiber cables include at least one first optical fiber cable laid in a first direction being a direction departing from a land surface or a direction approaching the land surface and at least one second optical fiber cable laid in a second direction being a direction non-parallel to the first direction.
[Supplementary Note 27]
The recording medium according to supplementary note 26, wherein
the target space is a two-dimensional space corresponding to a coordinate space including a first axis corresponding to the first direction and a second axis corresponding to the second direction, and
the object detection means detects, by using the sensing data, a location of the object in the two-dimensional space.
[Supplementary Note 28]
The recording medium according to supplementary note 26, wherein
the target space is a three-dimensional space corresponding to a coordinate space including a first axis corresponding to the first direction and a second axis and a third axis corresponding to the second directions different from each other, and
the object detection means detects, by using the sensing data, a location of the object in the three-dimensional space.
[Supplementary Note 29]
The recording medium according to any one of supplementary notes 26 to 28, wherein the first optical fiber cable is laid in a height direction of a high-rise building.
[Supplementary Note 30]
The recording medium according to any one of supplementary notes 26 to 29, wherein the second optical fiber cable is laid on a plurality of steel towers or a plurality of power poles or is buried in ground.
[Supplementary Note 31]
The recording medium according to any one of supplementary notes 25 to 30, wherein the object is a flying body or a bird.
[Supplementary Note 32]
The recording medium according to any one of supplementary notes 25 to 31, wherein the program causes the computer to function as an output control means for executing control for outputting information indicating a location of the object.

REFERENCE SIGNS LIST

1 Optical fiber cable
2 Optical fiber sensing device
3 Spatial sensing device
4 Output device
11 Sensing data acquisition unit
12 Object detection unit
13 Output control unit
21 Computer
31 Processor
32 Memory
33 Processing circuit
100 Spatial sensing system

What is claimed is:
1. A spatial sensing device comprising:
at least one memory configured to store instructions; and
at least one processor configured to execute the instructions to:
acquire sensing data based on optical fiber sensing using a first optical fiber cable laid in a first direction departing from a land surface or approaching the land surface and second optical fiber cable laid in a second direction that is not parallel to the first direction; and
detect a location of an object in a target space by using the sensing data,
wherein the location includes a first coordinate value corresponding to the first direction.
2. The spatial sensing device according to claim 1, wherein the target space is a two-dimensional plane corresponding to a coordinate plane including a first axis corresponding to the first direction and a second axis corresponding to a second direction, and
wherein the at least one processor detects a location of the object in the two- dimensional plane by using the sensing data.
3. The spatial sensing device according to claim 1, wherein the target space is a three-dimensional space corresponding to a coordinate space including a first axis corresponding to the first direction and a second axis and a third axis corresponding to directions different from each other, and
wherein the at least one processor detects a location of the object in the three- dimensional space by using the sensing data.
4. The spatial sensing device according to claim 1, wherein the first optical fiber cable is laid in a height direction of a high-rise building.
5. The spatial sensing device according to claim 1, wherein the second optical fiber cable is erected on a plurality of steel towers or on a plurality of power poles or is buried in ground.
6. The spatial sensing device according to claim 1, wherein the object is a flying body or a bird.
7. The spatial sensing device according to claim 1, wherein information indicating the location of the object is output.
8. The spatial sensing device of claim 1, wherein the sensing data includes at least-one of vibration, sound, or temperature based on distributed fiber optic sensing (DFOS).
9. A spatial sensing device of claim 1, wherein the object is separate from and moves relatively to the plurality of optical fiber cables.
10. A spatial sensing system comprising:
at least one memory configured to store instructions; and
at least one processor configured to execute the instructions teto:
acquire sensing data based on optical fiber sensing using a first optical fiber cable laid in a first direction departing from a land surface or approaching the land surface and second optical fiber cable laid in a second direction that is not parallel to the first direction; and detect a location of an object in a target space by using the sensing data, wherein the location includes a first coordinate value corresponding to the first direction.

11. The spatial sensing system according to claim 10, wherein the target space is a two-dimensional plane corresponding to a coordinate plane including a first axis corresponding to the first direction and a second axis corresponding to a second direction, and wherein the at least one processor detects a location of the object in the two-dimensional plane by using the sensing data.

12. The spatial sensing system according to claim 10, wherein the target space is a three-dimensional space corresponding to a coordinate space including a first axis corresponding to the first direction and a second axis and a third axis corresponding to directions different from each other, and wherein the at least one processor detects a location of the object in the three-dimensional space by using the sensing data.

13. The spatial sensing system according to claim 10, wherein the first optical fiber cable is laid in a height direction of a high-rise building.

14. The spatial sensing system according to claim 10, wherein the second optical fiber cable is laid on a plurality of steel towers or on a plurality of power poles or is buried in ground.

15. The spatial sensing system according to claim 10, wherein the object is a flying body or a bird.

16. The spatial sensing system according to claim 10, wherein information indicating a location of the object is output.

17. The spatial sensing system of claim 10, wherein the sensing data includes at least one of vibration, sound, or temperature based on distributed fiber optic sensing (DFOS).

18. A spatial sensing system of claim 10, wherein the object is separate from and moves relatively to the plurality of optical fiber cables.

19. A spatial sensing method comprising:

acquiring, by at least one memory configured to store instructions;, and at least one processor configured to execute the instructions, sensing data based on optical fiber sensing using a first optical fiber cable laid in a first direction departing from a land surface or approaching the land surface and second optical fiber cable laid in a second direction that is not parallel to the first direction; and detecting, by the at least one processor, a location of an object in a target space by using the sensing data, wherein the location includes a first coordinate value corresponding to the first direction.

20. The spatial sensing method according to claim 19, wherein the target space is a two-dimensional plane corresponding to a coordinate plane including a first axis corresponding to the first direction and a second axis corresponding to the second direction, and wherein the at least one processor detects a location of the object in the two-dimensional plane by using the sensing data.

21. The spatial sensing method according to claim 19, wherein the target space is a three-dimensional space corresponding to a coordinate space including a first axis corresponding to the first direction and a second axis and a third axis corresponding to directions different from each other, and wherein the at least one processor detects a location of the object in the three-dimensional space by using the sensing data.

22. The spatial sensing method of claim 19, wherein the sensing data includes at least one of vibration, sound, or temperature based on distributed fiber optic sensing (DFOS).

23. A spatial sensing method of claim 19, wherein the object is separate from and moves relatively to the plurality of optical fiber cables.

24. A spatial sensor, comprising:

at least one memory configured to store instructions; and at least one processor configured to execute the instructions to:

acquire sensing data from optical fiber cables oriented in different directions, wherein the optical fiber cables include a first optical fiber cable laid in a first direction departing from a land surface or approaching the land surface, and wherein the optical fiber cables define a target space; and detect an object moving within and relatively to the target space based on the sensing data, wherein the object is remote from the optical fiber cables, wherein the detected location of the object includes a first coordinate value corresponding to the first direction.

* * * * *